(12) United States Patent
Arora et al.

(10) Patent No.: US 9,262,452 B2
(45) Date of Patent: Feb. 16, 2016

(54) METHODS AND SYSTEMS FOR STORING EMAILS IN A MULTI-TENANT DATABASE SYSTEM

(75) Inventors: Pratima Arora, Sunnyvale, CA (US); Jeanine Walters, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/102,909

(22) Filed: May 6, 2011

(65) Prior Publication Data

US 2012/0179762 A1   Jul. 12, 2012

Related U.S. Application Data

(63) which is a continuation of application No. 61/322,606, filed on May 7, 2010.

(60) Provisional application No. 61/332,599, filed on May 7, 2010.

(51) Int. Cl.
*G06F 15/16* (2006.01)
*G06F 17/30* (2006.01)
*G06Q 10/10* (2012.01)

(52) U.S. Cl.
CPC ........ *G06F 17/30312* (2013.01); *G06Q 10/107* (2013.01)

(58) Field of Classification Search
CPC ..... H04L 51/08; H04L 51/22; H04L 63/0281; H04L 63/08; H04L 63/20; H04L 9/28; H04L 63/306; H04L 63/10; H04L 51/16
USPC .......................... 709/201, 202, 203, 206, 226
See application file for complete search history.

(56) References Cited

U.S. PATENT DOCUMENTS

| | | | | |
|---|---|---|---|---|
| 5,771,355 | A | * | 6/1998 | Kuzma ........................... 709/232 |
| 5,818,447 | A | * | 10/1998 | Wolf et al. ..................... 715/752 |
| 7,895,271 | B1 | * | 2/2011 | Malik ........................... 709/206 |
| 2005/0234843 | A1 | * | 10/2005 | Beckius et al. .................... 707/1 |
| 2009/0030997 | A1 | * | 1/2009 | Malik ........................... 709/206 |
| 2009/0077124 | A1 | * | 3/2009 | Spivack et al. ............. 707/103 Y |
| 2009/0282086 | A1 | * | 11/2009 | Heimes .......................... 707/200 |

* cited by examiner

*Primary Examiner* — Brian J Gillis
*Assistant Examiner* — Thao Duong
(74) *Attorney, Agent, or Firm* — Ingrassia Fisher & Lorenz, P.C.

(57) ABSTRACT

An email object is provided in a multi-tenant database system that can be related to multiple people (e.g., contact, lead, user) or any object represented for storage in the multi-tenant database system via sharing relationships. The email object follows a storage model such that some portions of an email are available using one form of storage and some portions of the email are available using another form of storage. In various aspects, a storage model provides users with a better value of a multi-tenant database system as storage requirements may be satisfied while providing users access to email content.

21 Claims, 16 Drawing Sheets

| organization_id | CHAR(15) NOT NULL | |
|---|---|---|
| message_id | CHAR(15) NOT NULL | primary key |
| subject | VARCHAR2(765) | first few characters of the email subject |
| body | VARCHAR2(765) | first few characters of the email body |
| raw_message | FFX_BLOB | pointer to the location of the full email in File force. |
| member_ids | VARCHAR2(4000) | comma-separated list of member ids (contact_id, lead_id, etc.) associated to this message and which address list they refer to. Example: 'T00300000000008g,F00500000000030d,C00Q00000000e9cw,'. This limits the total number of associations on a Message to 235. Will be marked as 'may contain ids' for migration and sandbox. |
| from_address | VARCHAR2(765) | text field of 'from' email address |
| to_address | VARCHAR2(765) | text field of 'to' email addresses |
| cc_address | VARCHAR2(765) | text field of 'cc' email addresses |
| email_message_id | VARCHAR2(255) | unique message-ID from the email header |
| associated | CHAR(1) | have the associations been processed? |
| template | CHAR(15) | email template reference (for outgoing messages only) |
| has_attachment | CHAR(1) | does this email have attachments? |
| sent_time | DATETIME | date-time |
| priority | CHAR(1) | dynamic enum |
| has_been_read | CHAR(1) | |
| case_ids | CHAR(15) | to eventually support email to case |
| standard auditing fields | | LAST_UPDATE, etc. |

FIG. 4

| TYPE | RECIPIENTS | SUBJECT | MESSAGE | ATTACHMENT | RECEIVED ▽ |
|---|---|---|---|---|---|
| | ME, ALLISON BAUER, JACK BROWN | SUBJECT SO AND SO (4) | THIS IS A TRUNCATED PART OF THE EMAIL'S BODY TEXT... | 📎 | TODAY, 4:06PM |
| | JACK BROWN, ALLISON BAUER | SUBJECT BLABAJAA;A (6) | THIS IS A TRUNCATED PART OF THE EMAIL'S BODY TEXT... | 📎 | AUG 5 |
| | ME, ALLISON BAUER | SUBJECT SO AND SO (2) | THIS IS A TRUNCATED PART OF THE EMAIL'S BODY TEXT... | | AUG 4 |
| ↑ | JACK BROWN | SUBJECT BLABAJAA;A | THIS IS A TRUNCATED PART OF THE EMAIL'S BODY TEXT... | | JULY 23 |
| ↓ | ME | SUBJECT SO AND SO | THIS IS A TRUNCATED PART OF THE EMAIL'S BODY TEXT... | | JUL 23 |

SHOW 5 MORE >> | GO TO LIST (25) >>

FIG. 7A

| ✉ EMAIL | | | | EMAIL HELP ⓘ |
|---|---|---|---|---|
| TYPE | RECIPIENTS | | | RECEIVED ▽ |
| | | [ NEW EMAIL ] | | |
| | | 7 OF 34 \| SEARCH [ ALLISON ] ⓧ 🔍 | | |
| | | SHOW ALL RESULTS | | |
| | ME, ALLISON BAUER... | ME, ALLISON BAUER | SUBJECT SO AND SO (4) | TODAY, 4:06PM | TODAY, 4:06PM |
| | JACK BROWN | JACK BROWN, ALLISON BAUER | SUBJECT BLABAJAA:A (6) | TODAY, 2:21PM 📎 | |
| | JACK BROWN, ALLISON BAUER | ME, ALLISON BAUER | SUBJECT SO AND SO (2) | AUG 23 | AUG 5 |
| | ME, ALLISON BAUER | JACK BROWN | SUBJECT BLABAJAA:A | AUG 5 📎 | AUG 4 |
| | JACK BROWN | ME | SUBJECT SO AND SO | AUG 5 📎 | JULY 23 |
| ↑ | | ME, ALLISON BAUER | SUBJECT SO AND SO (4) | AUG 4 | JUL 23 |
| ↓ | ME | JACK BROWN, ALLISON BAUER | SUBJECT BLABAJAA:A (6) | AUG 4 | |
| SHOW 5 MORE >> \| GO TO LIST (25) >> | | | | |

FIG. 7C

METHODS AND SYSTEMS FOR STORING EMAILS IN A MULTI-TENANT DATABASE SYSTEM

CROSS-REFERENCES TO RELATED APPLICATIONS

This Application claims priority to and the benefit of U.S. Provisional Application No. 61/332,599, filed May 7, 2010 and entitled "Methods and Systems for Storing Emails in a Multi-Tenant Database System" and U.S. Provisional Application No. 61/332,606, filed May 7, 2010 and entitled "Methods and Systems for Storing Emails in a Multi-Tenant Database System," each of which are hereby incorporated by reference for all purposes.

This Application is related to each of the following commonly owned Applications:

U.S. patent application Ser. No. 13/102,905, filed May 6, 2011, and entitled "Methods and Systems for Sharing Email in a Multi-Tenant Database System" which claims priority to U.S. Provisional Application No. 61/332,591, filed May 7, 2010 and entitled "Methods and Systems for Sharing Email in a Multi-Tenant Database System," each of which are hereby incorporated by reference for all purposes.

U.S. patent application Ser. No. 13/102,914, filed May 6, 2011 and entitled "Methods and Systems for Performing Email Management Customizations in a Multi-Tenant Database System," which claims priority to U.S. Provisional Application No. 61/332,616, filed May 7, 2010 and entitled "Methods and Systems for Performing Email Management Customizations in a Multi-Tenant Database System" and U.S. Provisional Application No. 61/332,621, filed May 7, 2010 and entitled "Methods and Systems for Dynamically Assigning Emails in a Multi-Tenant Database System," each of which are hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to emails, and more particularly to storing emails and email content in a multi-tenant database and/or application service.

BACKGROUND OF THE INVENTION

Electronic communication is a method of exchanging digital messages from an author to one or more recipients. Electronic communication may operate across the Internet or other computer networks. Some examples of electronic communicating may include electronic mail, commonly called email or e-mail, instant messaging, Short Messaging Service messages (SMS), and Multimedia Messaging Service (MMS). Electronic communication has become one of the main forms of communication for many people and organizations. Additionally, as usage of the Internet expands and high-speed access becomes more readily available, people and organizations more frequently rely on other businesses to deliver infrastructure, applications (Software as a Service), security, monitoring, and/or storage over the Internet or other wide area networks (WAN). Accordingly, customers need to be able to integrate electronic communication needs with these type of services.

However, interactions associated with electronic communications can be difficult to manage in applications that are managed by third parties. For example, a multi-tenant database system may include systems in which various elements of hardware and software of the database system are managed by one organization and shared by one or more customers of the organization. As a result, a given application server (e.g. running an application process) may simultaneously process requests for a great number of customers of the organization, and a given database table may store rows for a potentially much greater number of customers of the organization.

Accordingly, what is desired is to solve problems relating to storing electronic communications (such as emails and email content) in a multi-tenant database and/or application service, some of which may be discussed herein. Additionally, what is desired is to reduce drawbacks related to storing emails and email content in a multi-tenant database and/or application service, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

An email object is provided in a multi-tenant database system that can be related to multiple people (e.g., contact, lead, user) or any object represented for storage in the multi-tenant database system via sharing relationships. The email object follows a storage model such that some portions of an email are available using one form of storage and some portions of the email are available using another form of storage. In various aspects, a storage model provides users with a better value of a multi-tenant database system as storage requirements may be satisfied while providing users access to email content.

In one embodiment, a method is provided for storing electronic messages in a multi-tenant database system. One or more emails may be receiving at one or more computer systems associated with the multi-tenant database system. A first portion may be determined designated to be stored in a database associated with at least one tenant in the multi-tenant database system. A second portion of the email may be determined designated not to be stored in the database. The first portion may be stored in the database with a reference to the second portion as stored in a storage device different from the database. Accordingly, only information required to do perform predetermined actions (e.g., associations, show in lists, threading) is stored in the database. Data in the database may be used when running lists and reports while the second portion as stored in the storage device can be accessed to get detailed content.

In some embodiments, in determining the first portion of the email, header information may be determined and one or more summaries of the email may be generated. Other workflows or triggers may be invoked for processing the email and/or the first portion of the email. The second portion of the email may include header and body information extracted from the email.

In various embodiments, storing the first portion in the database with the reference to the second portion as stored in the storage device may include populating a field in the database with one or more links to the second portion of the email in the storage device.

In further embodiments, one or more attachments associated with the email may be identified. An instance of each attachment may be stored such that subsequent emails having the attachment are stored with a reference to the instance of the attachment.

In one embodiment, a non-transitory computer-readable medium stores computer-executable code for storing electronic messages in a multi-tenant database system. The non-transitory computer-readable medium can include code for receiving an email, code for determining a first portion of the email, the first portion designated to be stored in a database associated with at least one tenant in the multi-tenant database system, code for determining a second portion of the email, the second portion designated not to be stored in the database, and code for storing the first portion in the database with a reference to the second portion as stored in a storage device different from the database.

In another embodiment, a system for storing electronic messages in a multi-tenant database system can include a database, a storage device, and one or more computer systems associated with the multi-tenant database system and configured to receive an email, determine a first portion of the email, the first portion designated to be stored in a database associated with at least one tenant in the multi-tenant database system, determine a second portion of the email, the second portion designated not to be stored in the database, and store the first portion in the database with a reference to the second portion as stored in the storage device.

In yet another embodiment, a method for managing messages in a multi-tenant database system includes receiving information identifying one or more message stores. Each message store in the one or more message stores is associated with at least one object stored in a database associated with the multi-tenant database system. For each email in a plurality of emails, a corresponding message store may be determined for the email in the one or more message stores based on information associated with the email. The email may then be stored in the corresponding messages store. A determination may be made whether at least message store in the one or more message stores satisfies predetermined criteria. The at least one message store may then be communicated to one or more computer systems designated to process emails associated with the at least one object associated with the at least one message store.

In a further embodiment, determining the corresponding message store for the email in the one or more message stores based on the information associated with the email may include identifying a user of the multi-tenant database system who uploaded the email and selected the corresponding message store based on the user of the multi-tenant database system. Determining the corresponding message store for the email in the one or more message stores based on the information associated with the email may include identifying a sender of the email and selected the corresponding message store based on the sender of the email.

Storing the email in the corresponding messages store may include appending the email to a set of one or more emails stored in the corresponding messages store. Each of the one or more message stores may include email from a plurality of tenants in the multi-tenant database system. Communicating the at least one message store may include communicating a reference to the at least one message store in a non-relational data repository.

In other aspects, an email object may be generated and stored in a database associated with multi-tenant database system for at least one email in the at least one message store. The email object may be then linked to the at least one email in the at least one message store. Additionally, an email in the at least one message store may further be archived to a different message store.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 4 is a table representing individual emails that may be used with the on-demand database service of FIG. 1 in accordance with one embodiment.

DETAILED DESCRIPTION OF THE INVENTION

The present invention generally relates to managing electronic communications, and more particularly to sharing emails and email content in a multi-tenant database and/or application service.

Methods, systems, and computer-executable code stored on computer-readable media are provided for managing electronic communications in a multi-tenant database system. In one embodiment, an email object is provided for storing emails in a multi-tenant database system such that emails can be related to any other object represented for storage in the multi-tenant database system (e.g., multiple people identified as contacts, leads, users, etc.) via one or more sharing models. In one example, a sharing model is provided such that each email represented for storage in the multi-tenant database system inherits the sharing model or sharing relationships of a specified parent object represented for storage in the multi-tenant database system. In various aspects, each sharing model can provide users of a multi-tenant database system with more value from electronic communications as users are more informed about communications having relationships concerning people or other objects represented for storage in the multi-tenant database system.

As used herein, the term "multi-tenant database system" refers to those systems in which various elements of hardware and/or software of the database system may be shared by one or more customers. For example, a given application server (e.g. running an application process) may simultaneously process requests for a great number of customers, and a given database table may store rows for a potentially much greater number of customers. As used herein, the term "query" or "query plan" refers to a set of steps used to access information in a database system.

System Overview

Figure 1:
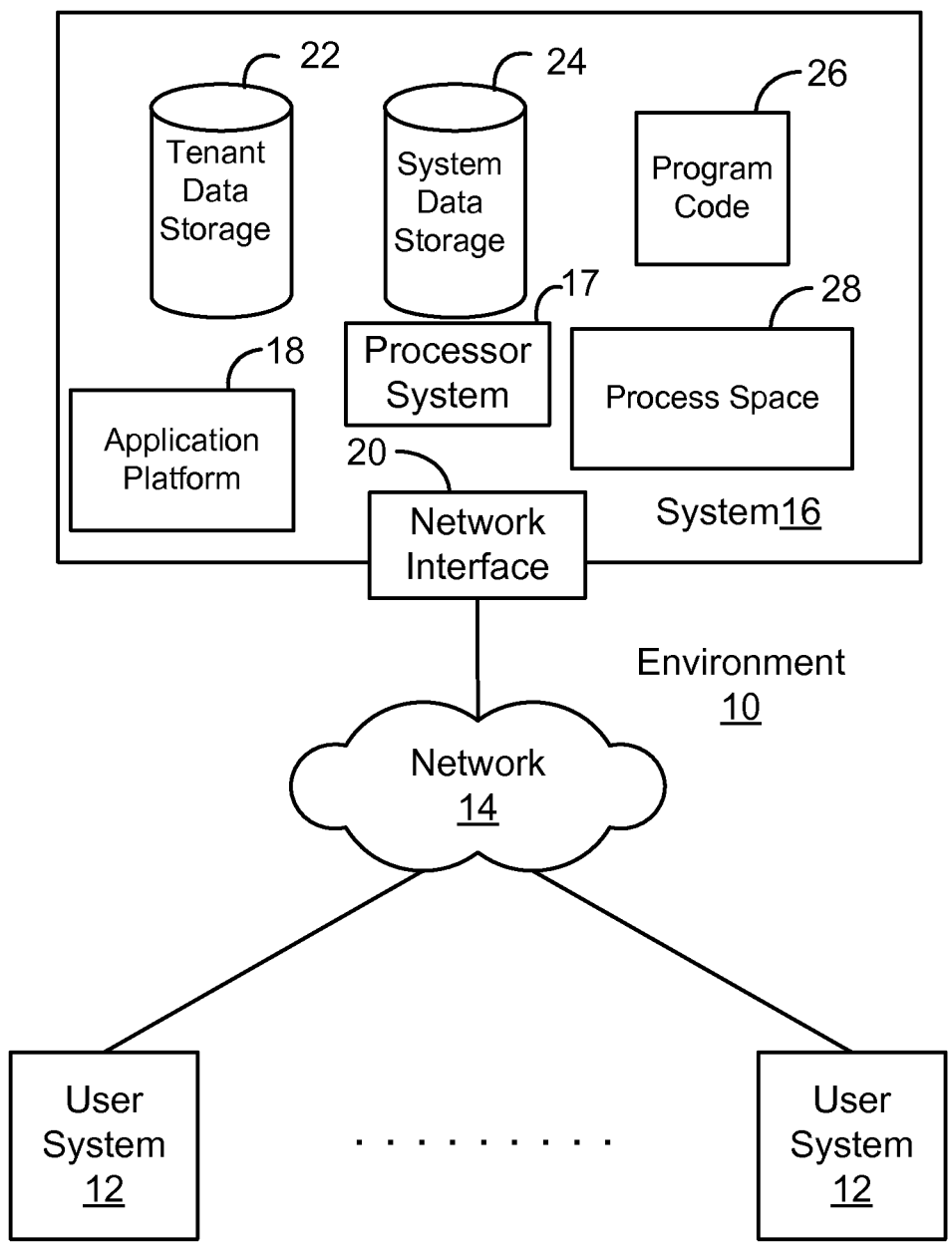
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database service (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant database system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Mozilla Foundation's Firefox browser, Google's Chrome browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
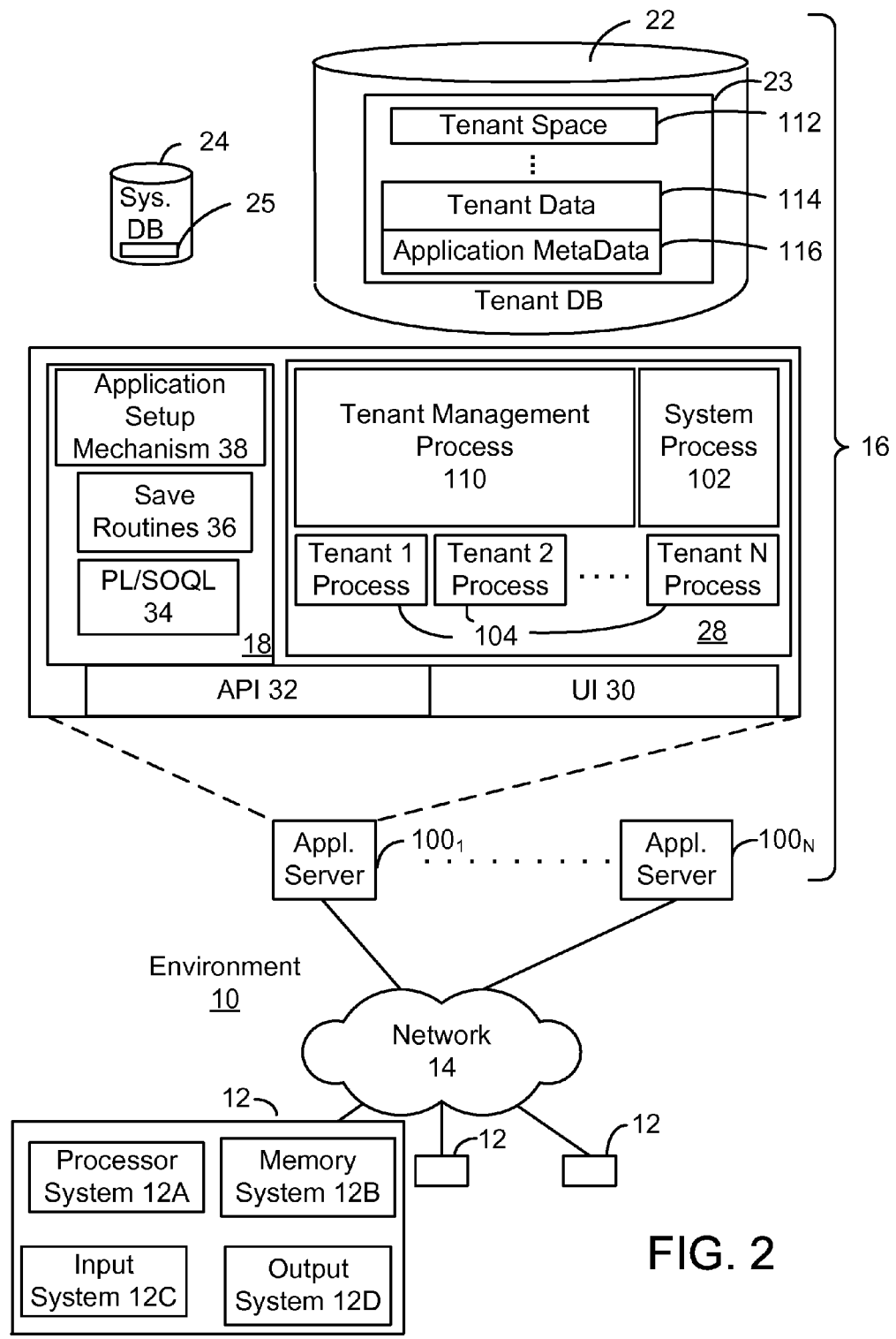
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated by reference for all purposes, teaches systems and methods for creating custom objects as well as customizing standard objects in a multi-tenant database system.

Multi-Tenant Database System Email Data Model

Email is one the main forms of communication for many people, including customers of multi-tenant database systems. Email interactions can be difficult to manage in such applications when saved as traditional entities that doesn't solve problems of threading, and relating emails to multiple people (e.g., contacts, leads and users) and/or objects (e.g., opportunities, cases, accounts, custom objects etc.). Another problem is that users may have all their customer data in another application, such as Outlook, and there is no easy way to save that in their CRM application; hence the rich information is lost in their inbox.

According to one embodiment, a new email object is provided that includes the capabilities of threading and one-to-many relationship between email and other objects in a multi-tenant database system, such as system 16. Email stored in system 16 can be associated to multiple contacts, multiple leads, multiple person accounts, business accounts, opportunities (e.g., emails can be explicitly associated to opportunities or they can show up in opportunity related list such as if they were associated to a contact who is a contact role on the opportunity), cases, and other entities represented for storage in system 16. Associations can be done automatically or user can manually add or delete associations using one or more graphical user interfaces.

Figure 3:
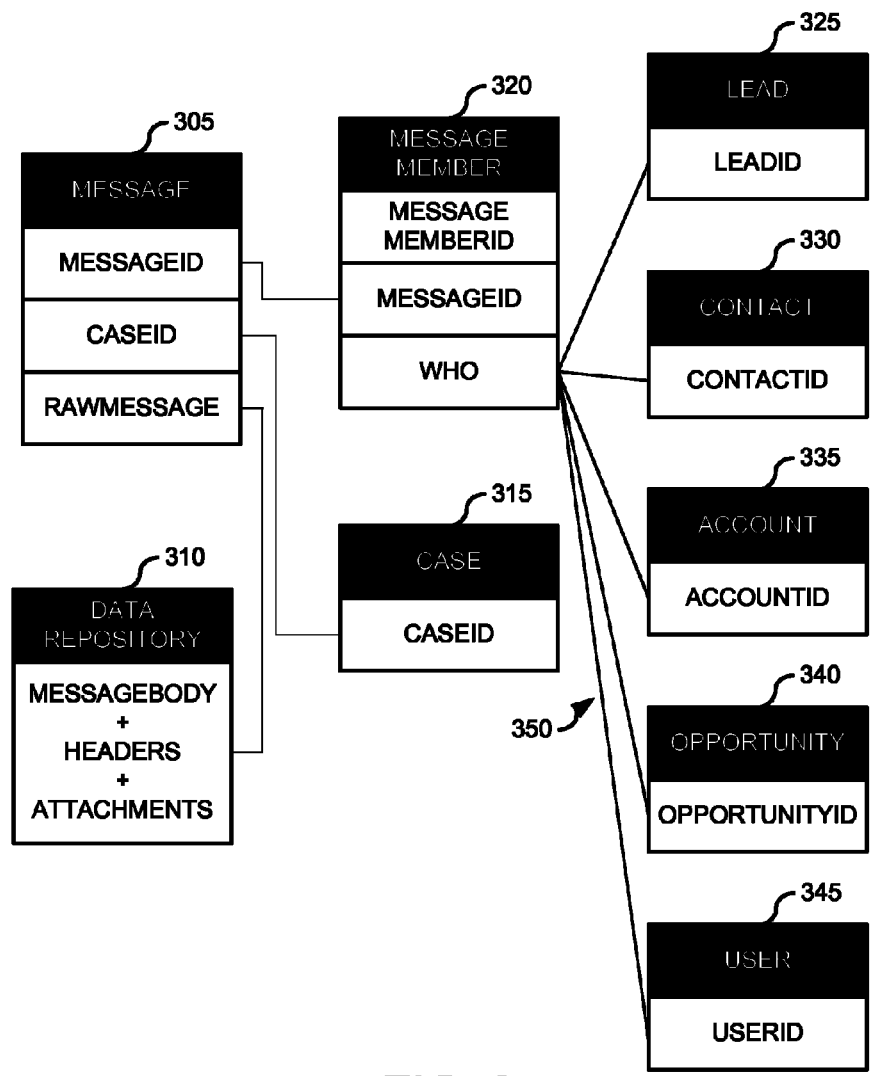
FIG. 3 is an illustration representing an email object that may be used with the on-demand database service of FIG. 1 in accordance with one embodiment.

FIG. 3 is an illustration representing email object 305 that may be used with system 16 of FIG. 1 in accordance with one embodiment. Email object 305 can include one or more elements, attributes, or properties. In this example, email object 305 includes a message identifier (e.g., MESSAGEID), a case identifier (e.g., CASEID), and a raw message identifier (e.g., RAWMESSAGE). In some embodiments, email object 305 may include one or more elements, attributes, or properties for storing data associated with email messages, such as raw email data from specific header fields (e.g., from/to/cc/etc) or portions of email content. In another aspect, email object 305 may include one or more elements, attributes, or properties for storing links, pointer, or other references to other objects in system 16 or to a data repository where data associated with email messages is actually stored.

In the example provided, the raw message identifier associated with email object 305 can include data that may be used as a link, pointer, or other reference to an email represented by email object 305 as stored in a data repository by data repository object 310. Data repository object 310 may include the message body of the email, any headers, and any attachments stored in any one of a variety of formats, file systems, or the like. Various portions of an email message may be parsed and/or indexed using features supported by a data repository to provide for accelerated retrieval of all or a portion of the email represented by email object 305. In the same example, the case identifier associated with email object 305 can include data that may be used as a link or pointer to one of a selected number of objects represented for storage in system 16 (e.g., case 315). Other additional elements, attributes, or properties of email object 305 may be included to support different types of objects and use cases.

In various embodiments, the message identifier associated with email object 305 in the same example can include data that may be used as a link, pointer, or other reference to message member object 320. Message member object 320 may include elements, attributes, or properties that identify members of an email discussion represented by an email and that act as sharing junctions between email object 305 and a selected number of objects represented for storage in system 16. Some examples of such objects might include Lead, Contact, Account, Opportunity, and User. In this example, message member object 320 includes a message member identifier (e.g., MESSAGEMEMBERID), a message identifier (e.g., MESSAGEID), and a set of one or more who identifiers (e.g., WHO).

In some embodiments, email object 305 may include one or more custom elements, attributes, or properties. Some examples may include custom fields for long text fields (e.g., so that email discussions may be summarized), flags/to-do type custom fields, or custom fields for integrating with marketing apps that generate mass emails for tracking who read the email, who forwarded the email etc.

FIG. 4 is an illustration representing a table 400 for individual emails that may be used with system 16 of FIG. 1 in accordance with one embodiment. In this example, one or more columns of table 400 are defined to contain data related to potential email fields, such as a sender field, recipient fields, and subject field. Additionally, one or more columns of table 400 are defined to contain summaries or truncated versions of potential email fields, the message body, or attachments. Moreover, one or more columns of table 400 are defined to contain a link, pointer, or other references to a full version of an email message, parsed email content, summarized or truncated email fields, or attachments. According to another embodiment, one or more indexes may be generated using one or more columns of table 400.

Email object 305 may further be related to multiple people (e.g., contact, lead, user) or multiple objects represented for storage in system 16 via sharing relationships 350 identified by message member object 320. In one aspect, email object 305 follows a sharing model where each email entity inherits the sharing of a parent record, i.e. if a user can see a contact—that user can see all the emails shared with the contact where the contact was a recipient, or similarly if a user can see an opportunity—that user can see all the emails that were related to that opportunity even if that user was not on the email thread.

Figure 5:
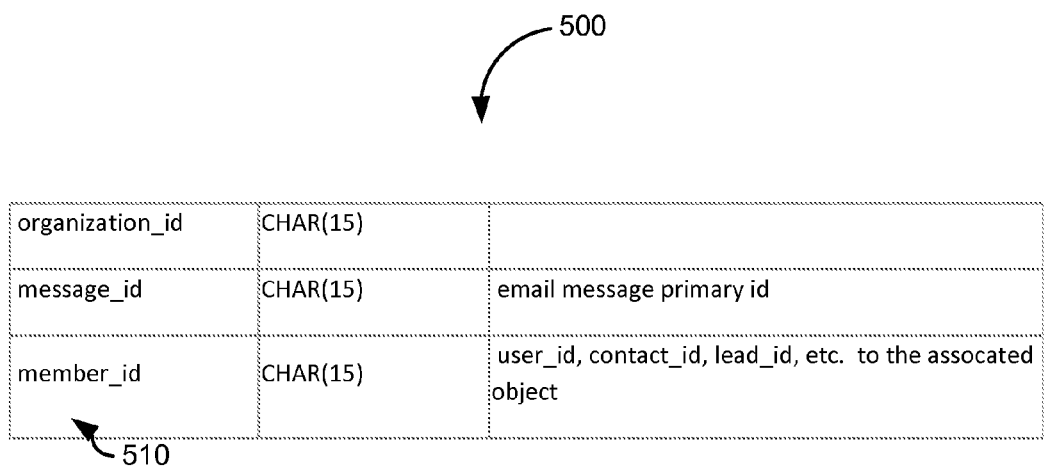
FIG. 5 is a table representing many-to-many relationships between messages and other objects in the on-demand database service of FIG. 1 in accordance with one embodiment.

FIG. 5 is an illustration representing table 500 for many-to-many relationships between an email and other object in accordance with one embodiment. Table 500 implemented as an index-organized table and populated by an database-style trigger. In this example, one or more columns of table 500 are defined to contain polymorphic keys (e.g., member_id column 510).

In various aspects, email object 305 can be applicable to both inbound and outbound messages of system 16. Inbound message may include electronic messages received by system 16 from an external source, e.g., those message forwarded to or otherwise uploaded to system 16. Outbound messages may include electronic message sent from system 16 or from one or more associated application server. Thus, inbound and outbound messages may be stored in system 16 using email object 305. Additionally, inbound and outbound messages may be associated with other objects of system 16 and shared by inheriting sharing options of a related record.

In further embodiment, inbound and outbound messages may be organized and processes using features expected of traditional email clients. For example, inbound and outbound messages may be threaded or grouped into one or more threads or conversations. Users may be also be provided with functionality to compose and send emails using Templates. Additionally, user may be able to reply, replay all and forward emails within aspects of system 16.

In still further embodiments, email object 305 provides users of system 16 access to a greater variety of improved discovery and reporting features. In one example, a user may have access to Email Report Types such as User Emails (My Emails, My Team's Emails), Emails with Contacts, Emails with Opportunities, Emails with Leads, Emails with Accounts, other objects introduced as required in a multi-tenant database system. In yet another example, a user may have access to Activity Report Scopes such as My Activities+ My Emails which support a user's current expectations of emails as Activities. In other aspects, a user may have access to a variety of options for email reports, such as different views (e.g., My Emails, My Team's Emails), email direction (e.g., Inbound, Outbound), Standard Date Fields, and other filter criteria and column options. In one aspects, an organization may provide a variety of standard reports (e.g., Emails I received from a contact(s), Emails I sent to a contact(s), All the emails on a account, Summary Report of Emails that were logged against all my open opportunities—together with a drill into Opportunities).

In yet further embodiments, email object 305 email object 305 provides users of system 16 access to a greater variety of improved viewing components. For example, dashboards may include information about open opportunities with most activities in the last predetermined number of days, open opportunities in a team with most activities in the last predetermined number of days/week, most contacted people, or the like. Further customizations may be made to provide statistical metrics such as the number of emails logged on an opportunity vs. how long was the opportunity open, the average number of emails getting logged on opportunities, the average number of activities on a lead that converted to a contact, or the find of activities: breakdown by email, events, calls etc. As a further extension, one or more views may be provided from where users can take action. For example, a user may take one or more actions where emails are not associated properly. In another example, a message center may be provided from which a user may act on emails that where sent or received in the last predetermined number of days.

In various embodiments, email object 305 provides users of system 16 access to a greater variety of improved workflows or triggers. One example may include inbound related of workflows or triggers (e.g., users want to run workflows and trigger on when emails get logged). For example, if an email comes from the CEO or certain set of people of the company, log a task to take action, send an email out. In another example, a "# Emails" custom field on a Contact may be updated. Another example may include outbound related. For example, when an email is sent by a subordinate, first send it to a supervisor for approval. In another example, add a footer to every email message or selected ones of email messages that are sent out. In a related aspect, triggers and workflows on other objects can generate emails. For example, if a case is escalated, an email may be sent out to a user or contact. Other examples may include outbound related workflows or triggers and workflows or triggers associated with related objects.

Email Logging

In various embodiments, sharing for messages can be derived from message member object 320. A user can have access to a corresponding email object 305 if they have access to one of associated leads, contacts, accounts, or opportunities, or their user indentifies or one of their subordinates' identifiers is part of the WHO information.

Figure 6:
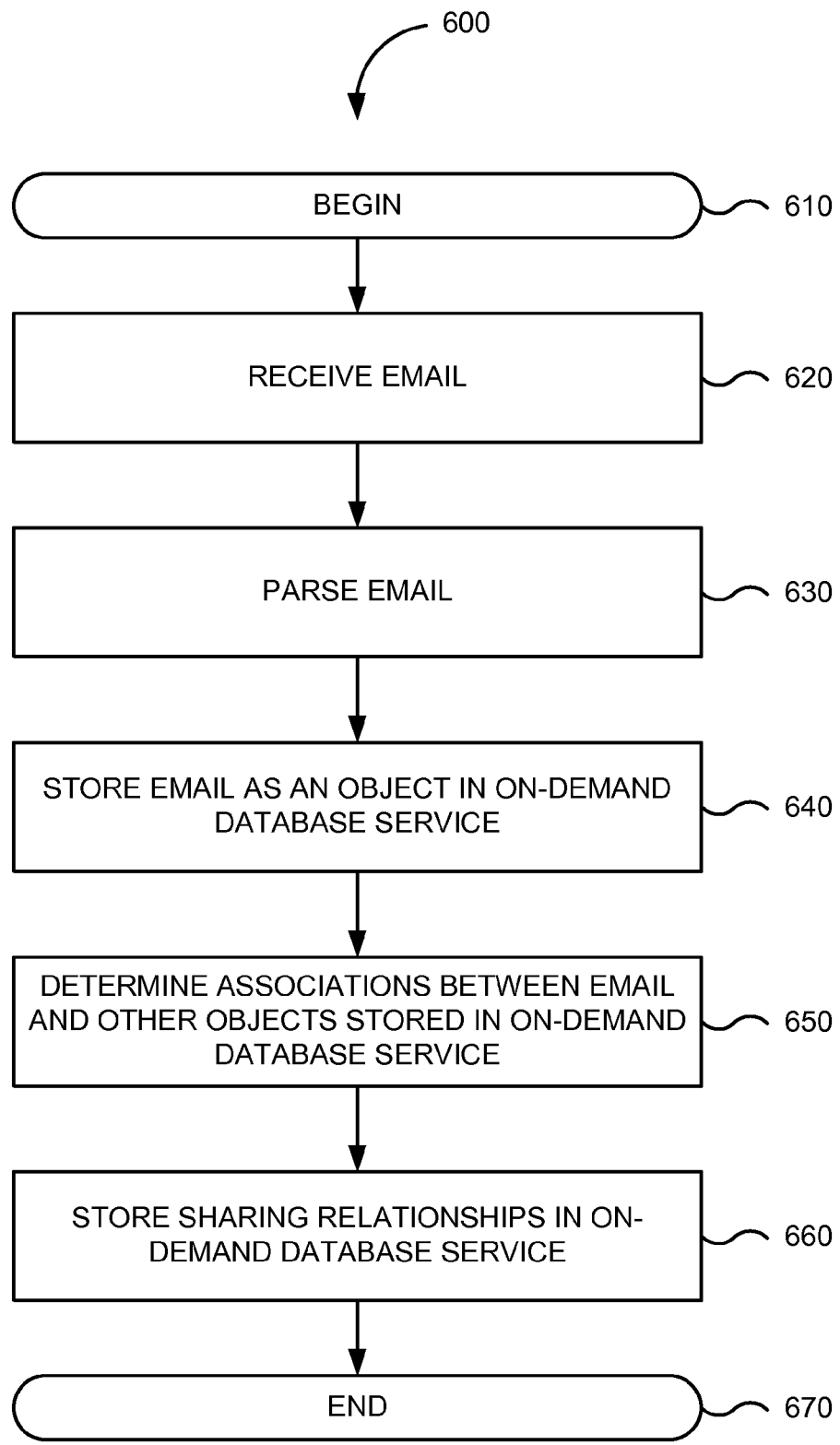
FIG. 6 is a simplified flowchart of a method for generating email objects in the on-demand database service of FIG. 1 in one embodiment according to the present invention.

FIG. 6 is a simplified flowchart of method 600 for generating email objects in a multi-tenant database system in one embodiment according to the present invention. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, one or more emails are received. For example, a user of system 16 may redirect emails delivered to an email client to system 16. In general, any email system or email client may be used. In another example, a user may upload emails, instant messages, SMS messages, or the like to system 16 using an email client plug-in, one or more APIs, or one or more web services. In yet another example, emails, texts, or the like sent from an application associated with system 16 may be forward to and/or captured by system 16 for logging. Messages may be delivered one at a time or in batches for processing.

In step 630, the one or more emails are parsed. Messages may be parsed into email fields, attributes, or properties. For example, one or more parsers may designate data in an email as pertaining to header attributes or properties, a message body attributes or properties, and/or attachment attributes or properties. Other emails attributes or properties may be provided or sub-attributes or sub-properties designate as needed. Furthermore, distinctions may be made between original message data and derived message data being message data included or forward with the original message data that corresponds to another email message.

In step 640, the one or more emails are stored as objects in an on-demand database service. As discussed above, email object 305 may be used by system 16 to represent one or more fields, attributes, or properties of the received email or provide links to where such data is stored. In step 650, one or more associations are determined between the received email and other objects stored in the on-demand database service.

For example, a mapping engine associated with system 16 may be configured analyze the received email (or the stored email object) to associate the sender of the email or any recipients of the email to objects represented for storage within system 16. As discussed above, such objects could be Leads, Contacts, Accounts, Opportunities, Users, or other custom objects. The mapping engine may find at least one recipient/sender of the email that can be mapped to an existing object and mark the email for further processing, such as for creating other objects or for instantiating other workflows or triggers.

In one aspect, one or more mapping engines may be used. Each mapping engine may include hardware and/or software elements configured for generating associations based on a set of rules. In various embodiments, a set of rules may be defined for determining associations. Each rule may include one or more conditions or criteria that need to be satisfied for the rule to apply. The rule may further include one or more actions to be performed, such as for which entity or object is a relationship to be generated.

For example, one or more rules may be provided for associating messages with contacts. In one aspect, one or more rule may specify that if all email addresses of people on a conversation are found, the email should be logged automatically. If there is a contact that is not found, then the email may be assigned to an associations queue for further rules processing or manual association. In another example, for an email where a contact was not found, one or more entities or objects may be retrieved and suggested. In one instance, if an email from user@equinox.com is received and an entity or other object represented for storage in the multi-tenant database system is associated with the name of Equinox Inc. but there is no contact for the user@equinox.com, a contact may be automatically created and the account information pre-populated or the contact may be suggested for manual creation. Sharing relationships then may be created between the email object and the automatically or manually created contact.

In another instance, if an mail is received jill.bower@lucky.com and jill.bower@lucky.com is not found as a contact or lead nor is Lucky found as a company, a contact and/or account may be automatically created or the contact and/or account may be suggested for manual creation. Sharing relationships then may be created between the email object and the automatically or manually created contact and/or account. In yet another instance, if an email is received from Renne.Jogerson@comcast.com and Renne.Jogerson@comcast.com is not found as a contact or lead but multiple accounts for comcast are found (e.g., Comcast USA, Comcast Cable, Comcast Internet etc.), a contact may be automatically created and the account information pre-populated from a user selecting one or the potentially multiple related accounts or the contact may be suggested for manual creation and association. Sharing relationships then may be created between the email object and the automatically or manually created contact.

In a further instance, if an email is received from jim.turner@baybridgecontracts.com and there are potentially duplicate contacts, a contact may be selected from the multiple related contacts. Sharing relationships then may be created between the email object and the contact. In yet a further instance, if an email is received where there are 5 people and 2 in found as contacts, the email may be logged and automatically associated with all the contacts or leads found. For contacts where there is no match, the email or the unmatched addresses may be suggested for manual processing.

In another aspect, one or more rules may specify the associations between leads and email addresses of people on a conversation. For example, if no contact or lead is found, a lead can be automatically created or suggested for manual creation. Additionally, if a lead is found (e.g., matched based on email address), an email may be associated with that lead or multiple leads.

In yet another aspect, one or more rules may specify the associations between accounts and email addresses on a conversation. For example, all emails where one account and one contact was found based on the email address may be associated to contact (and in-directly to an account). All emails where a contact was found but no account may be logged, an option may be provided for users to choose if they always want to associate an email to a business contact, create an account, or the like. In a still further aspect, one or more rules may specify the associations between opportunities and email addresses on a conversation. One or more settings may be provided for a user to automatically associated emails to opportunities with certain pre-defined criteria or data. One or more rules may further specify the associations between cases, custom objects, and other entities represented for storage in the multi-tenant database system and email addresses on a conversation.

In step 660, any determined sharing relationships are stored in the on-demand database service. Accordingly, each inbound and outbound message processed by system 16 may be associated with objects of system 16 from which visibility of the email within system 16 may be driven. In one example, a user of system 16 can see all emails logged by system 16 to all users, leads, contacts, etc. FIG. 6 ends in step 670.

Figure 7B:
FIG. 7 is a screenshot of a graphical user interface illustrating messages stored in the on-demand database service of FIG. 1 in one embodiment according to the present invention.

FIG. 7 is a screenshot of graphical user interface 700 illustrating messages stored in system 16 in one embodiment according to the present invention. In various embodiments, sharing relationships between objects and selected emails can be generated automatically for senders and recipients of an email using one or more mapping engines as discussed above. In further embodiments, associations can be generated manually by adding or deleting associations using one or more graphical user interfaces. If a user of system 16 has access to an object, the user then is able to view any messages that have sharing relationships with that object. In this example, graphical user interface 700 displays, for each of a number of conversations determined from selected emails processed by system 16, list 710 of recipients in the conversations. List 710 of recipients may include links to other objects of system 16, such as users, contact, or the like.

Graphical user interface 700 may further display, for each of a number of conversations determined from selected emails processed by system 16, visual representation 720 which provides an indication of the size of a conversation. One example of a visual representation of the size of a conversation may include the total number of emails within a conversation. Graphical user interface 700 also may display, for each of a number of conversations determined from selected emails processed by system 16, visual representation 730 which provides an indication of the type of emails. Emails may be part of a conversation (e.g., depicted by an icon of a group of people), be an outbound email (e.g., depicted by an arrow in a predetermined direction), be an inbound email (e.g., depicted by an arrow in a predetermined direction), be part of a workflow (e.g., depicted by an icon representing the workflow), or the like.

Graphical user interface 700 may display, for each of a number of conversations determined from selected emails processed by system 16, one or more search interfaces 740. Each search interface 740 may be included to provide search functionality of emails processed by system 16 or of objects associated with emails. For example, users of system 16 can do a free text search on email. In one aspect, users of system 16 can search for emails from related objects or lists. Users of system 16 can search the header of the emails, the body of the emails, or any other attributes or properties of the emails. In some instances, a side bar email search can be limited to searching emails based on object type or specific criteria, such as where user is a sender or receiver. Other aspects can include other options to search for all emails that the user has visibility into.

Figure 8A:
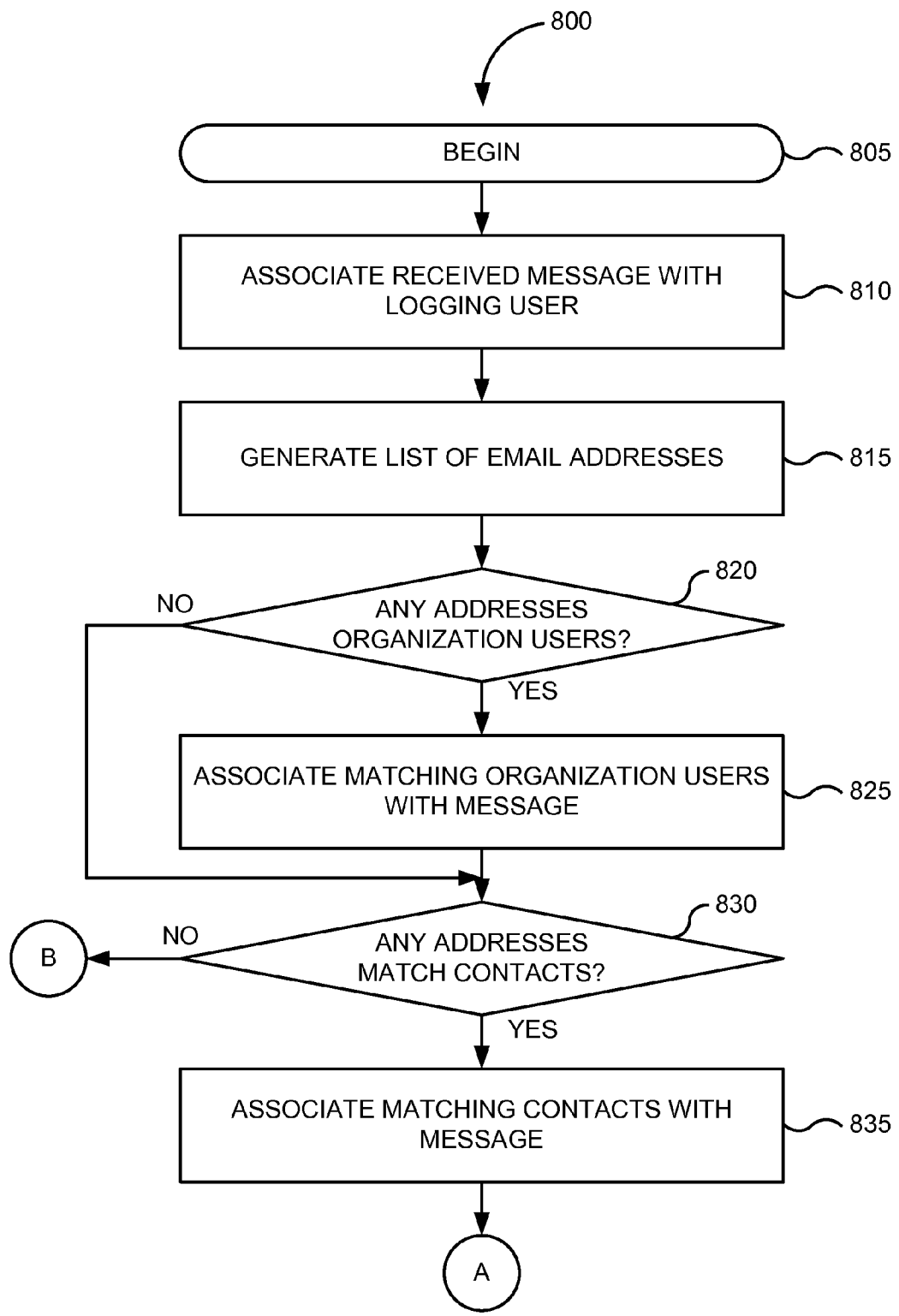
FIGS. 8A, 8B, and 8C are a flowchart of a method for logging email associations in the on-demand database service of FIG. 1 in one embodiment according to the present invention.
Figure 8B:
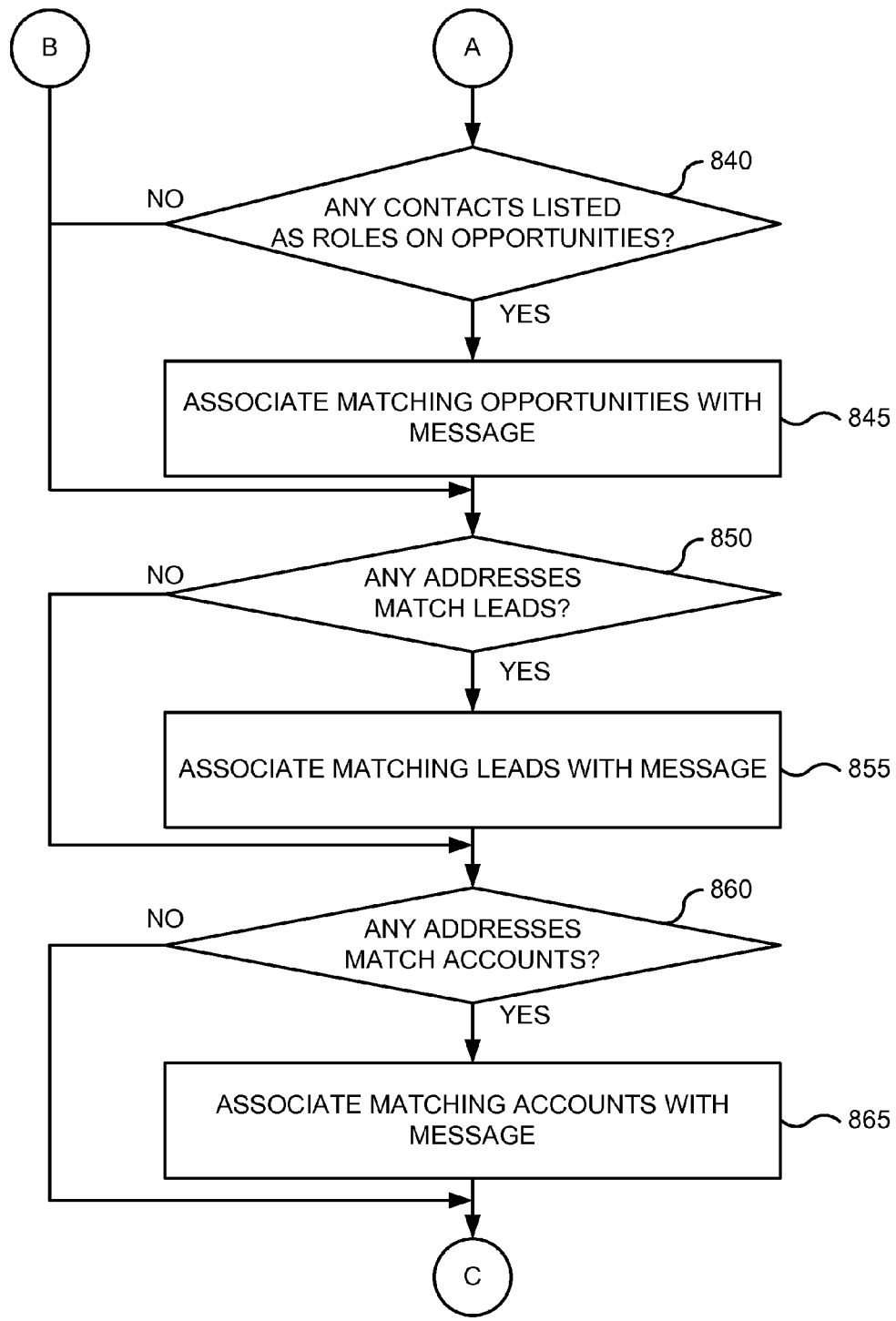
Figure 8C:
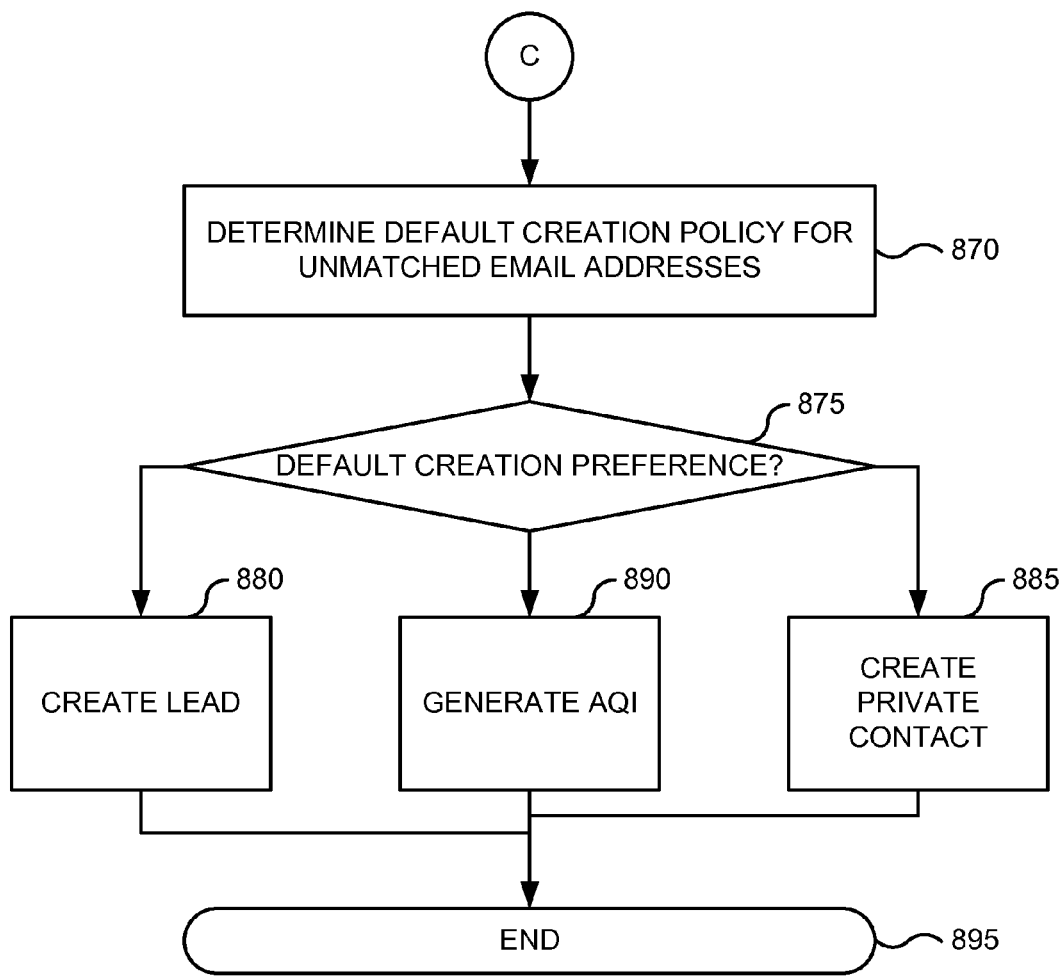

FIGS. 8A, 8B, and 8C are a flowchart of method 800 for logging email associations in a multi-tenant database system in one embodiment according to the present invention. Implementations of or processing in method 800 depicted in FIGS. 8A, 8B, and 8C may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIGS. 8A, 8B, and 8C begins in step 805 of FIG. 8A.

In step 810, one or more messages received are associated with a logging user. Typically, the logging user corresponds to a user object of system 16 or an application object of system 16 performing the forwarding of emails or the uploading of emails to system 16. In some instances, the logging user may not be identified as a sender or recipient in an email forwarded to or uploaded to system 16. An association may be generated between the logging user and each of the one or more messages such that the logging user has access in system 16 to each of the one or more messages simply by virtue of having forwarded or uploaded the emails to system 16.

In step 815, a list of email addresses is generated. For example, header information associated with the one or more messages received by system 16 may be analyzed to determine any and all email addresses (e.g., sender and/or recipients) in the one or more messages. In another example, the message body of the one or more messages may be analyzed for additional email addresses. Other email addresses may be determined from metadata associated with the one or more messages, from lookups from directory services using existing email addresses, or from other accessible sources using information obtained from the one or more messages or about a logging user.

In step 820, a determination is made whether any addresses in the list of email addresses are organization users or match organization users. In one example, an organization that uses system 16 may create user objects for each user of the organization. An organization user may be determined directly by consulting or querying the user objects of the organization. In another example, an organization user may be determined indirectly by consulting or querying one or more directory services associated with the organization.

If a determination is made in step 820 that one or more addresses in the list of email addresses are organization users or match organization users then in step 825 the matching organization users are associated with the message. For example, a message member object parented to the corresponding email object may be created and/or updated with WHO information for each matching organization user. If a determination is made in step 820 that none of the addresses in the list of email addresses match organization users or all associations have been found then processing continues in step 830.

In step 830, a determination is made whether any addresses in the list of email addresses are contacts of a user or match contacts of a user. For example, an organization that uses system 16 may create contact objects for the organization or for each user of the organization. A contact may be determined directly by consulting or querying the contact objects of the organization or the contact objects of a user of the organization (e.g., the logging user). A contact may be determined indirectly by consulting or querying one or more contact directory services associated with the organization. An organization may have a shared contact database and/or each user of an organization may have a personal contact database.

If a determination is made in step 830 that one or more addresses in the list of email addresses match contacts then in step 835 the matching contacts are associated with the message. For example, a message member object parented to the corresponding email object may be created and/or updated with WHO information for each matching contact. If all associations have been made then processing continues in step 840 of FIG. 8B. If a determination is made in step 830 that none of the addresses in the list of email addresses match contacts then processing continues in step 850 of FIG. 8B.

In step 840, a determination is made whether any matched contacts match are listed as roles on opportunities. For example, an organization that uses system 16 may create opportunity objects for the organization or for each user of the organization. Opportunity objects may have entities that serve particular roles. Any roles associated with an opportunity may be determined by consulting or querying the opportunity objects of the organization (e.g., using one or more databases storing information associated with opportunities).

If a determination is made in step 840 that one or more matched contacts are listed as roles on opportunities then in step 845 the matching opportunities are associated with the message. For example, a message member object parented to the corresponding email object may be created and/or updated with WHO information for each matching opportunity. If a determination is made in step 840 that none of the matched contacts are listed as roles on opportunities or all associations have been found then processing continues in step 850.

In step 850, a determination is made whether any addresses in the list of email addresses are leads or match leads. For example, an organization that uses system 16 may create lead objects for the organization or for each user of the organization. A lead may be determined by consulting or querying the lead objects of the organization (e.g., using one or more databases storing information associated with leads). If a determination is made in step 850 that one or more addresses in the list of email addresses match leads then in step 855 the matching leads are associated with the message. For example, a message member object parented to the corresponding email object may be created and/or updated with WHO information for each matching lead. If a determination is made in step 850 that none of the addresses in the list of email addresses match leads or all associations have been found then processing continues in step 860.

In step 860, a determination is made whether any addresses in the list of email addresses are accounts or match accounts. For example, an organization that uses system 16 may create account objects for the organization or for each user of the organization. An account may be determined by consulting or querying one or more databases storing information associated with accounts. If a determination is made in step 860 that one or more addresses in the list of email addresses match accounts then in step 825 the matching accounts are associated with the message. For example, a message member object parented to the corresponding email object may be created and/or updated with WHO information for each matching accounts. If a determination is made in step 820 that none of the addresses in the list of email addresses match accounts or all associations have been found then processing continues in step 870 of FIG. 8C.

In various embodiments, any addresses that can't be resolved (e.g., being malformed or the like), associated with any object of system 16, or associated to only a single object of system 16 may be added to one or more associations queues. Each association queue provides a mechanism for a logging user to reconcile asynchronously associations between objects in system 16 as further discussed below. In some embodiments, one or more policies may be associated with queues that facilitate object reconciliation.

In step 870, a default creation policy is determined for any unmatched email addresses in the list of email addresses. For example, a determination may be made in step 875 that for any addresses in the list of email addresses that are unmatched a lead should be created. Based on a determination in step 875 that a lead should be created, in step 880, a lead object is created and a message member object parented to the corresponding email object may be created and/or updated with WHO information for the newly created lead. In another example, a determination may be made in step 875 that for any addresses in the list of email addresses that are unmatched a contact should be created. Based on a determination in step 875 that a contact should be created, in step 885, a contact object is created and a message member object parented to the corresponding email object may be created and/or updated with WHO information for the newly created contact. The contact object may be made available privately only to the logging user or publically to groups or other users of an organization.

In yet another example, a determination may be made in step 875 that for any addresses in the list of email addresses that are unmatched further processing is required. Based on a determination in step 875 that further processing is required one or more additional workflows may be instantiated. For example, in step 890, an associations queue item (AQI) is generated for each unmatched email address. Email addresses can end up in an associations queue (AQ) if they cannot be automatically matched to entities such as Users, Leads, Contacts or Opportunities. Once an address is in an AQ, a user can be given the opportunity to asynchronously resolve those addresses. In various embodiments, the user may be provided with options such as:

Always ignore this email address for this user
Delete email, including all recipients
Skip—Don't associate this recipient, leave email and existing associations
Create new Lead
Associate to existing Lead
Create new Contact
Associate to existing Contact
Create new Account
Create new Opportunity
Associate to existing Opportunity
Search for all the above objects In some aspects, items can automatically be removed from an AQ after a predetermined number of days through a timed background process. Accordingly, a logging user is able to reconcile asynchronously associations between objects in system 16. FIG. 8C ends in step 895.

Email Storage

Email logging in a multi-tenant database system allows users to log their emails with ease and minimum effort from any email system. In some aspects, emails from users' mailboxes may be sent to the multi-tenant database system using forwarding rules or client plug-ins. The multi-tenant database system receives the emails and stores them using, for example, the new email object discussed above. Further, the multi-tenant database system may automatically process emails using default and user-defined settings and associate emails with the right user, contact, lead, account, opportunity, or other custom object.

Saving billions of email in a multi-tenant database system is not easy, and for scalability purposes. According to one embodiment, email content is saved in separate storage from a database associated with a tenant in the multi-tenant database system. This storage may be cheaper or configured for archival storage. In some aspects, only information satisfying predetermined criteria, such as that required to perform associations, show in lists, perform threading, or the like may be stored in the database. Data in the database may be used when running lists and reports while the separate storage may be accessed to obtain further details.

Figure 9:
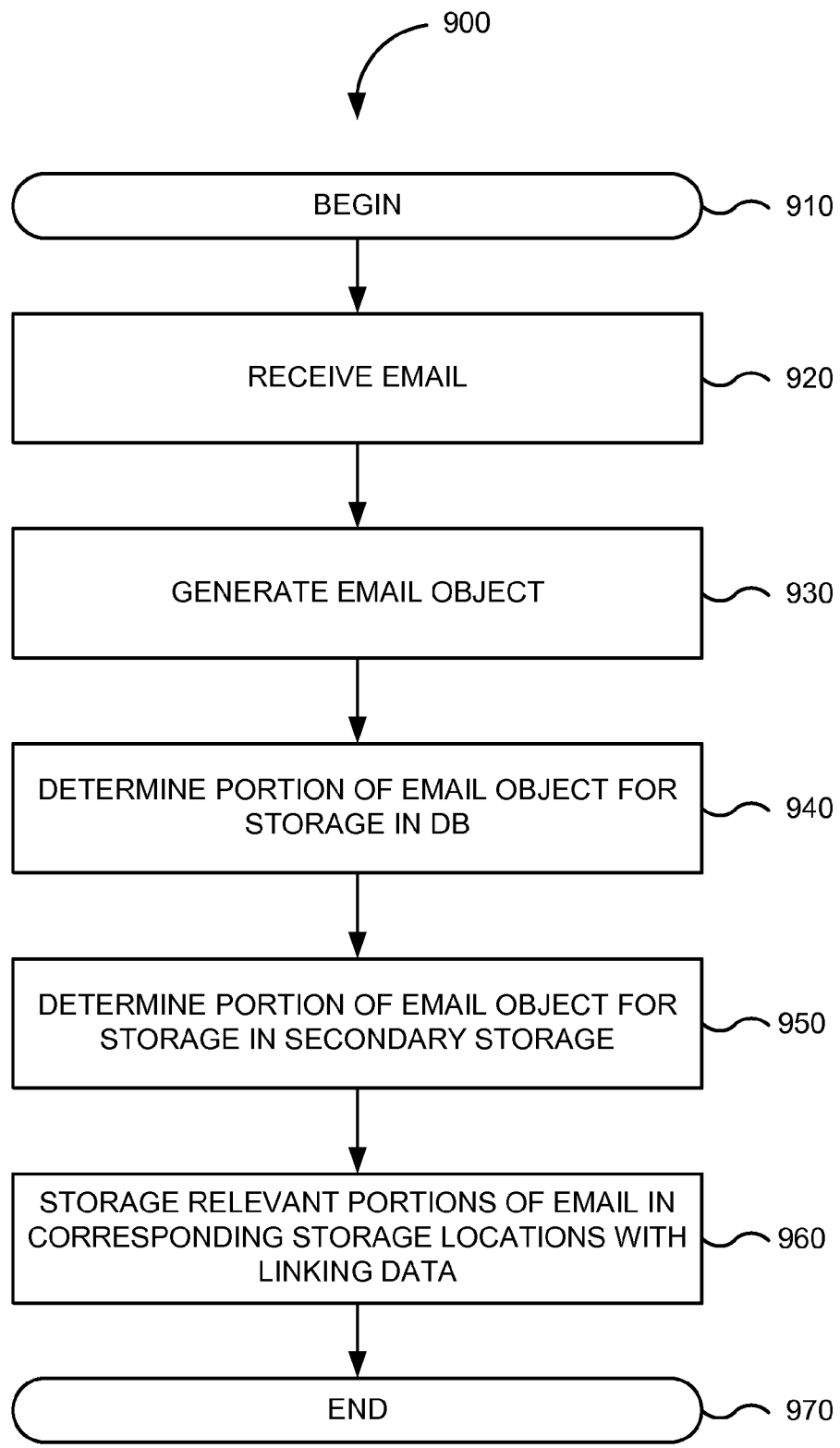
FIG. 9 is a flowchart of a method for storing electronic messages in the on-demand database service of FIG. 1 in accordance with one embodiment.

FIG. 9 is a flowchart of method 900 for storing electronic messages in a multi-tenant database system in accordance with one embodiment. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, one or more emails are received. For example, a user of system 16 may redirect emails to be delivered to the multi-tenant database system or upload emails from an email client to the multi-tenant database system where they can be parsed and processed. In another example, emails sent from an application associated with system 16 may be saved for processing by the multi-tenant database system. Emails may be delivered one at a time or in batches for processing. In various embodiments, a user of a multi-tenant database system may forward emails from the user's mail boxes or log emails using one or more API's. In general, any email system or email client may be used. Emails may be input into the multi-tenant database system at the email server level or using one or more client plug-ins.

In step 930, an email object is generated. For example, the one or more emails may be parsed into email attributes or properties. One or more parsers may designate data in an email as pertaining to header attributes or properties, a message body attributes or properties, and/or attachment attributes or properties. Other emails attributes or properties may be provided or sub-attributes or sub-properties designate as needed. Furthermore, distinctions may be made between original message data and derived message data being message data included or forward with the original message data that corresponds to another email message.

In step 940, one or more portions of each email is determined for storage in a database. For example, as discussed above, the email object can include data representing one or more attributes or properties or links to one or more attributes or properties. A message table (e.g., table 400) may be provided representing individual emails which contains truncated versions of some of the email fields such as subject and body and a pointer or reference to other portions of the emails in secondary storage. Accordingly, frequently used information may be accessible in database storage while the full remaining information may available in secondary storage.

Some reasons for the division of storage may include access speed, storage costs, information retrieval requirements (e.g., what information is most necessary at what time), or the like.

In step 950, one or more portions of each email is determined for storage in secondary storage. The secondary storage may be a storage repository supporting a variety of storage mechanisms. In step 960, all relevant portions of the emails are stored in the corresponding storage locations with linking data. For example, the portion determined for storage in the database may be stored according to the new email object data model. The portion determined for storage in secondary storage may be stored according to one or more data formats, files systems, etc. of the secondary storage. Accordingly, any email objects stored in the database may include references, pointers, links or other associations to the data stored in secondary storage. FIG. 9 ends in step 970.

Figure 10:
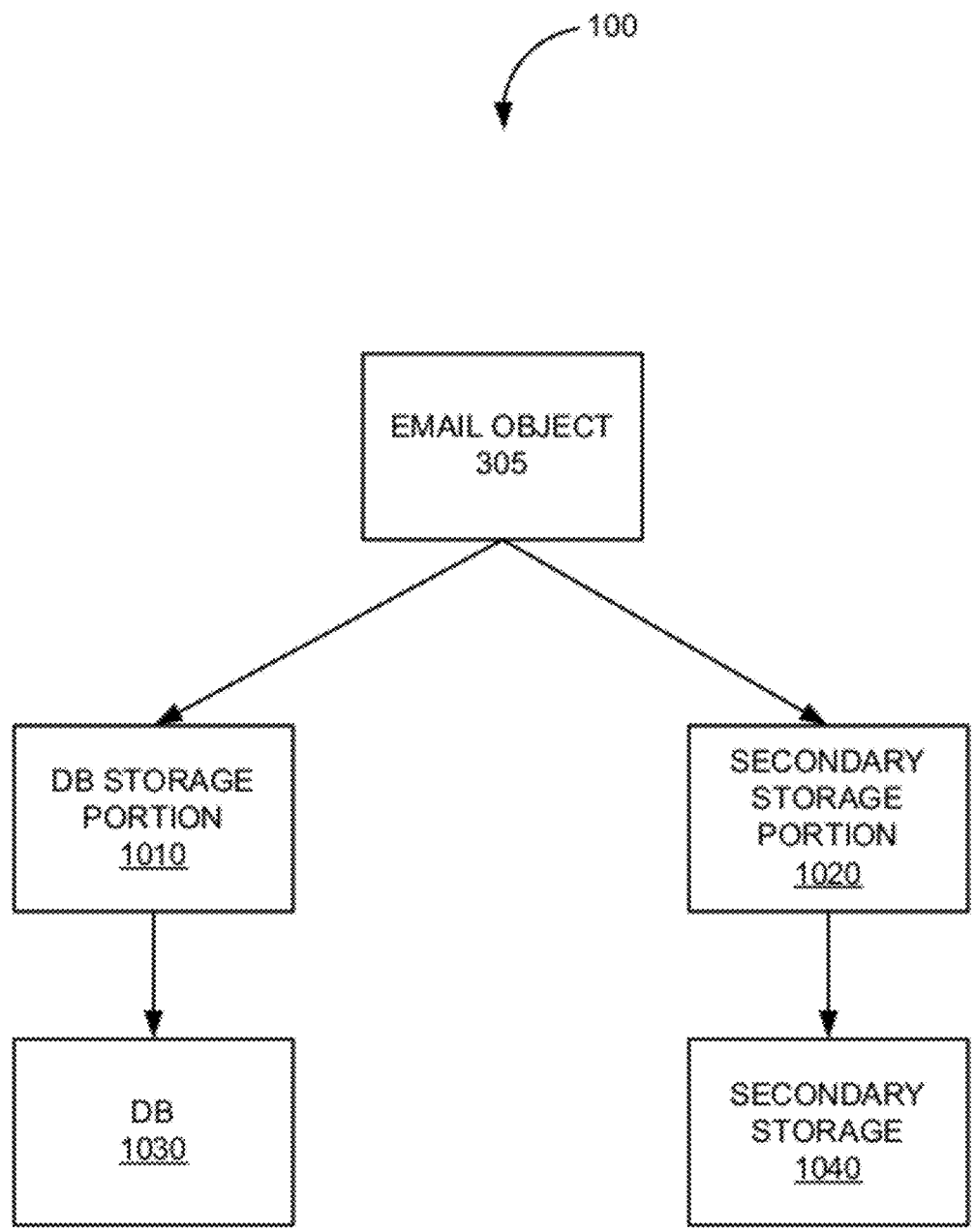
FIG. 10 is a block diagram illustrating storage of electronic messages in the on-demand database service of FIG. 1 in accordance with one embodiment.

FIG. 10 is a block diagram illustrating storage of electronic messages in a multi-tenant database system in accordance with one embodiment. In this example, email object 305 is apportioned into database storage portion 1010 and secondary storage portion 1020. One or more models may define how email object 305 is apportioned into database storage portion 1010 and secondary storage portion 1020. Such models may take into consideration factors such as access speed, storage costs, data type or formatting, information retrieval requirements, or the like. One or more policies may be established in which messages satisfying certain characteristics are presented for storage in one or more types of storage. For example, emails from a certain domain or user may be stored entirely in one type of storage or the other. In other examples, criteria such as size, attachments, importance may be used to determined a storage solution. As illustrated, database storage portion 1010 is stored in database 1030 and secondary storage portion 1020 is stored in secondary storage 1040.

In various embodiments, one or more archiving policies may be determined for storage. For example, emails may be moved to another storage system (e.g., a database archive or tertiary storage) after 180-365 days. Such storage solutions may provide that emails in archived storage are to remain at least searchable. In various embodiments, one or more APIs may provide access to get emails out of archived storage.

According to some embodiments, email attachments may be pre-processed for storage determination. For example, as emails are coming in, attachments may be saved once. If multiple emails arrive or are forwarded with same attachment on a thread, only one attachment is saved and all the emails on the thread are linked to the single attachment. The link of the attachment can also be sent to an end user who is not using system 16, for example, using a content delivery mechanism.

Message Aggregation

In order to improve storage of volumes of emails, in various embodiments, a non-relational store is provided for temporary storage of emails. Emails then can processed and/or bundled into a larger file for storage in a non-relational storage device. In one aspect, as emails enter a multi-tenant database system, each email may be appended to a file that contains recently-received emails for multiple tenants. Once the file satisfies predetermined criteria, such as reaching a certain size limit or until the oldest message in that file has been sitting for too long, the file is then processed and/or moved to another storage device.

Figure 11:
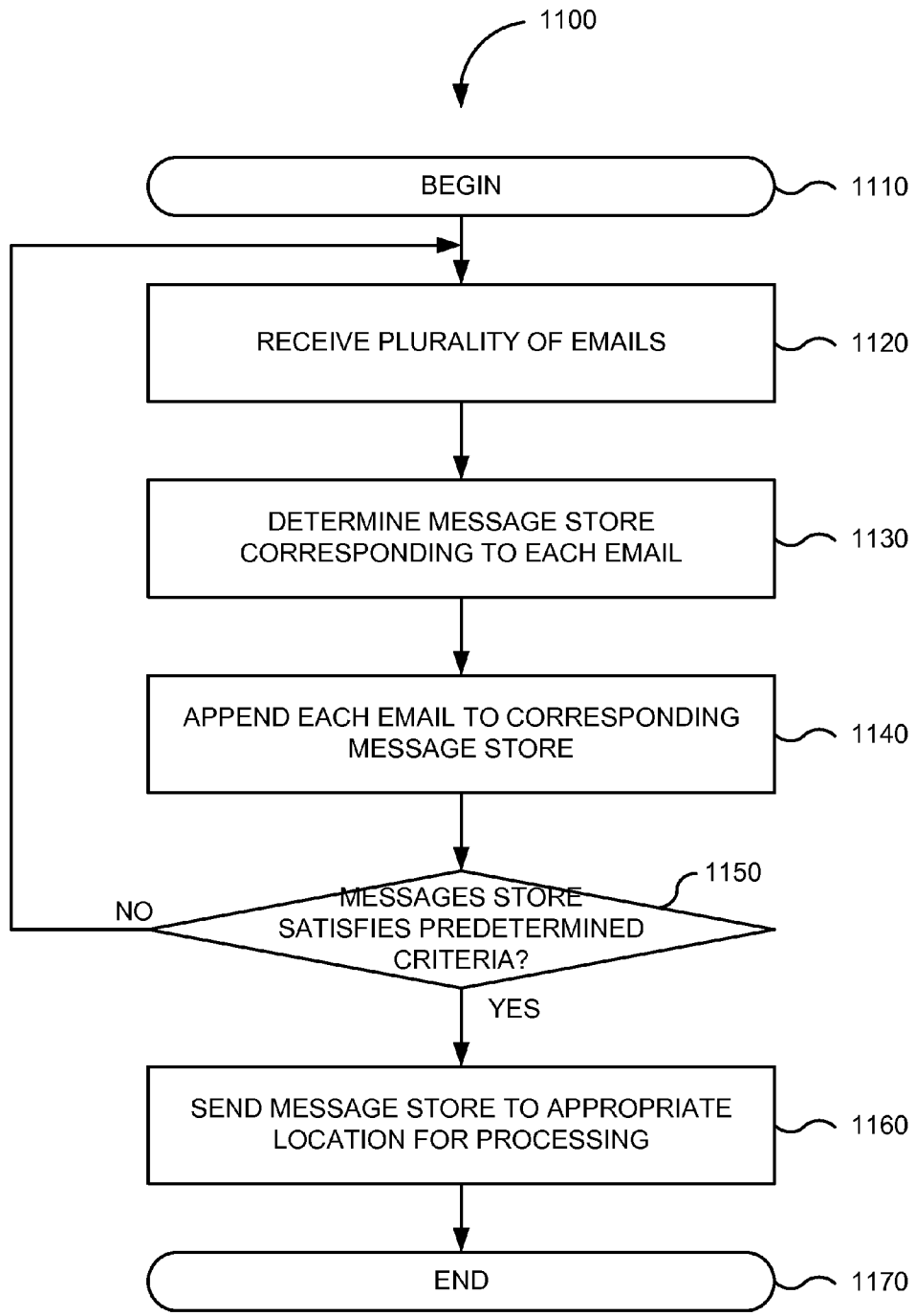
FIG. 11 is a flowchart of a method for aggregating electronic messages in the on-demand database service of FIG. 1 in accordance with one embodiment.

FIG. 11 is a flowchart of method 1100 for storing electronic messages in a multi-tenant database system in accordance with one embodiment. Implementations of or processing in method 1100 depicted in FIG. 11 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1100 depicted in FIG. 11 begins in step 1110.

In step 1110, one or more emails are received. For example, a user of system 16 may redirect emails to be delivered to system 16 or upload emails from an email client to system 16 where they can be parsed and processed. In another example, emails sent from an application associated with system 16 may be saved for processing by system 16. Emails may be delivered one at a time or in batches for processing. In various embodiments, a user of system 16 may forward emails from the user's mail boxes or log emails using one or more API's. In general, any email system or email client may be used. Emails may be input into system 16 at the email server level or using one or more client plug-ins.

In step 1130, a message store corresponding to each email in the one or more emails is determined. For example, a message store may include one or more files, blocks, or memory locations. A messages store may reside wholly in memory, on disk, or a combination thereof. A messages store may further reside wholly in a database, on a file system, or in a combination of data repositories. In one embodiment, a messages store is a temporary file defined as a non-relational file associated with a user, a group, an organization, a tenant of system 16, multiple tenants, or a physical/logical architectural component of system 16.

One or more rules, conditions, or other criteria may be used to determine whether an email corresponds to a particular message store. In one embodiment, one or more rules may dictate that any emails logged by a particular user correspond to a message store designated for an organization associated with the particular user. In another embodiment, one or more rules may dictate that any emails received by system 16 are evaluated to determine whether email addresses of the emails correspond to a message store for a user of system 16 having one or more email addresses. In yet another embodiment, one or more rules may distribute emails to corresponding messages stores based on how resources in system 16 are allocated to multiple users, organizations, or tenants.

In step 1140, each email is appended to a corresponding messages store. In one example, an email is appended to a temporary file using one or more formats used for holding collections of electronic mail messages (e.g., mbox or the like). Each message may be concatenated and stored as plain text. The beginning of each message may be indicated by one or more tokens, such as a line whose first five characters consist of "From" followed by a space and the return path e-mail address. One or more additional tokens, such as a blank line, may be appended to indicate the end of each message. Other formats for storing unstructured data may be used as is known in the art.

In step 1150, a determination is made whether the message store satisfies one or more predetermined criteria. For example, a determination may be made whether a message store has reaches a certain size limit, a certain number of emails, or the like. Additionally, a determination may be made in regard to the oldest message in a message store. Other criteria may be related to message attributes, such as sender information or recipient information, and message content, such as body information, attachment data, or the like. In various embodiments, other criteria may be related to availability of resources in system 16 that are allocated to users, organizations, or tenants.

In step 1160, based on a determination that the message store satisfies the predetermined criteria, the message store is sent to an appropriate location for processing. For example, a message store (or a link or reference thereto) may be forwarded or sent to one or more computer systems associated with system 16 that correspond to user, group, organization, tenant of database system 16. One or more rules may dictate to where the message store is send based on, for example, availability of resources in system 16 that are allocated to users, organizations, or tenants, or physical/logical architectural component of the system 16. FIG. 11 ends in step 1170.

Accordingly, messages may be accumulated by system 16 in a consistent manner for later processing by those elements of system 16 closets to users, organizations, or tenants to which the emails pertain. In some embodiments of system 16, an email accumulator functioning as described above may be implemented as a mail catcher for all tenants or as a service for one or more application servers associated with at least one tenant. As a mail catcher, incoming email can be accepted by a message transfer agent and passed for email logging. The mail catcher may dispose of email failing to satisfy criteria or rules, such as SPAM, emails with invalid tokens, or emails that exceeds rate limiting or size limitations. As discussed above, emails can be stored in a specific message store (e.g., files corresponding to particular users, organizations, tenants, or components of system 16) until, for example, a messages store reaches a certain size limit, or until the oldest message has been sitting too long.

In various embodiment, some message stores may contain messages from multiple users, organizations, tenants, or the like. For example, each message store may be a mingled file having messages co-mingled from different users, organizations, tenants, or the like. In one aspect, a mingle file may be saved a non-relational data repository. As emails, for example, are stored as email objects as discussed above, system 16 may incorporate a link, pointer, or other reference to the mingled file (and/or the individual message therein) in the non-relational data repository.

In various embodiments, when a message is logged (e.g., a list of email address from To, CC and From lists is generated and addresses are associated with users, contacts, leads, etc.), system 16 may asynchronously sort (or shortly thereafter) a mingled file into one or more user, organizations, or tenant-oriented non-relational message stores. These messages stores may not include co-mingled messages. Accordingly, system 16 may update the links, pointers, or references of any message objects to their new locations in the non-relational message stores.

Message Archiving

In various embodiments, as email object 305 includes information that may be stored in a database associated with system 16 and information that may be stored in a non-relational message store or data repository, system 16 provides one or more mechanisms for archiving messages. For example, emails may be moved based on predetermined criteria to another storage system, such as after 180-365 days from receipt. Information stored in a database associated with system 16 may be archived to another database or to a non-relational data repository. Additionally, information stored in a non-relational message store or data repository may be archived to other storage. After archival of message, in various embodiments, system 16 preserves the ability of the messages to be searchable. Moreover, visibility and sharing of archived messages can be maintained.

In further embodiments, system 16 may provide one or more mechanisms allowing logged or archived messages to be deleted. For example, system 16 may allow a user to delete messages one at a time or purge a plurality of emails together. In another aspect, system 16 may allow users to create policies that define how long messages stay in un-archived state and in an archiving solution. In at least one embodiment, system 16 provides one or more mechanisms for which users can "Save Forever" certain messages and/or provide access to get messages out of system 16 by exporting messages using one or more message formats, containers, or the like.

Hardware Overview

Figure 12:
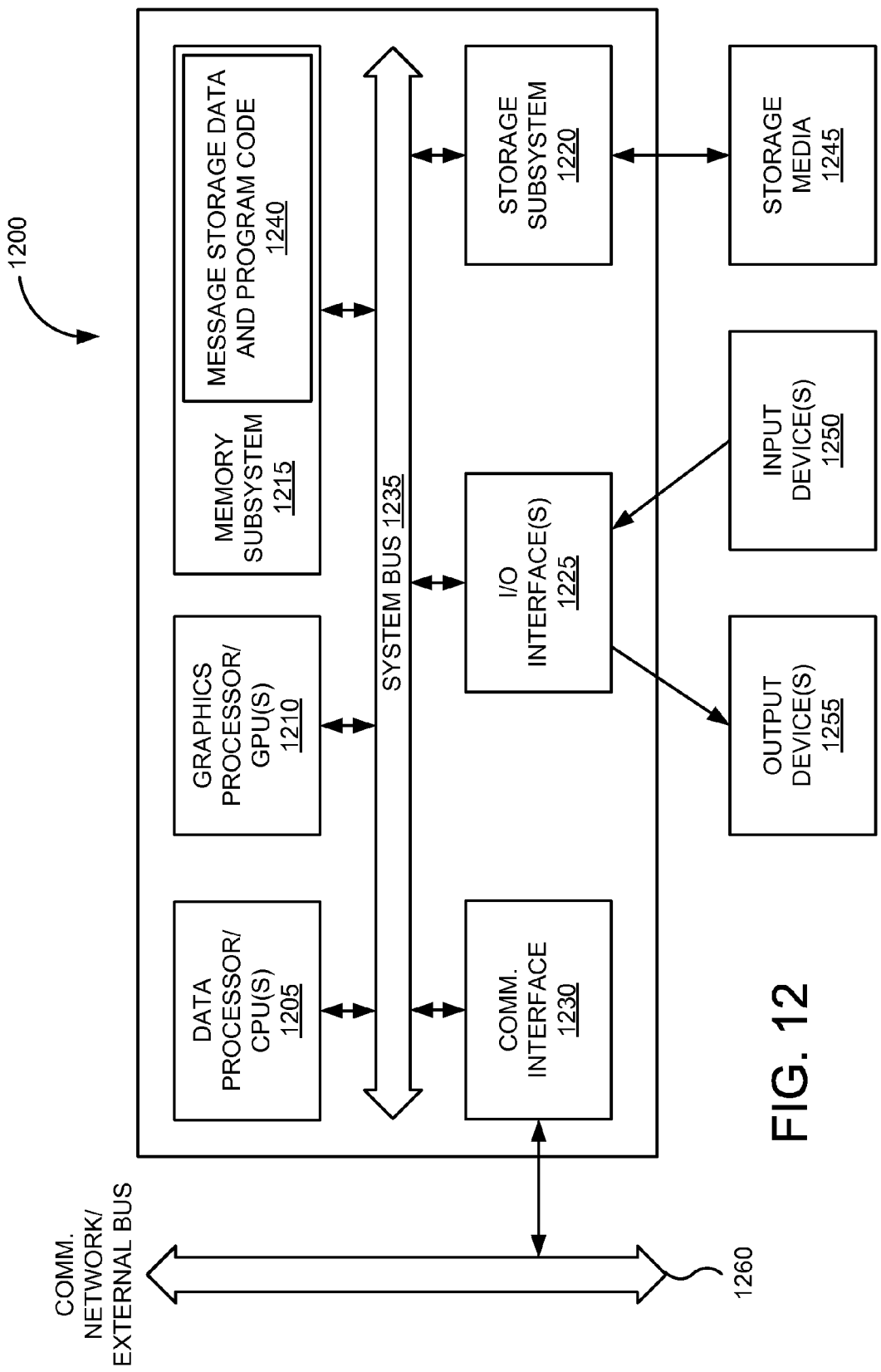
FIG. 12 is a block diagram of a computer system or information processing device that may incorporate an embodiment, be incorporated into an embodiment, or be used to practice any of the innovations, embodiments, and/or examples found within this disclosure.

FIG. 12 is a block diagram of computer system 1200 that may incorporate an embodiment, be incorporated into an embodiment, or be used to practice any of the innovations, embodiments, and/or examples found within this disclosure. FIG. 12 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1200 can include hardware and/or software elements configured for performing logic operations and calculations, input/output operations, machine communications, or the like. Computer system 1200 may include familiar computer components, such as one or more one or more data processors or central processing units (CPUs) 1205, one or more graphics processors or graphical processing units (GPUs) 1210, memory subsystem 1215, storage subsystem 1220, one or more input/output (I/O) interfaces 1225, communications interface 1230, or the like. Computer system 1200 can include system bus 1235 interconnecting the above components and providing functionality, such connectivity and inter-device communication. Computer system 1200 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1205 can include hardware and/or software elements configured for executing logic or program code or for providing application-specific functionality. Some examples of CPU(s) 1205 can include one or more microprocessors (e.g., single core and multi-core) or micro-controllers. CPUs 1205 may include 4-bit, 8-bit, 12-bit, 16-bit, 32-bit, 104-bit, or the like architectures with similar or divergent internal and external instruction and data designs. CPUs 1205 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1205 may also include one or more field-gate programmable arrays (FPGAs), application-specific integrated circuits (ASICs), or other microcontrollers. The one or more data processors or central processing units (CPUs) 1205 may include any number of registers, logic units, arithmetic units, caches, memory interfaces, or the like. The one or more data processors or central processing units (CPUs) 1205 may further be integrated, irremovably or moveably, into one or more motherboards or daughter boards.

The one or more graphics processor or graphical processing units (GPUs) 1210 can include hardware and/or software elements configured for executing logic or program code associated with graphics or for providing graphics-specific functionality. GPUs 1210 may include any conventional graphics processing unit, such as those provided by conventional video cards. Some examples of GPUs are commercially available from NVIDIA, ATI, and other vendors. In various embodiments, GPUs 1210 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1210 may include any number of registers, logic units, arithmetic units, caches, memory interfaces, or the like. The one or more data processors or central processing units (CPUs) 1205 may further be integrated, irremovably or moveably, into one or more motherboards or daughter boards that include dedicated video memories, frame buffers, or the like.

Memory subsystem 1215 can include hardware and/or software elements configured for storing information. Memory subsystem 1215 may store information using machine-readable articles, information storage devices, or computer-readable storage media. Some examples of these articles used by memory subsystem 1270 can include random access memories (RAM), read-only-memories (ROMS), volatile memories, non-volatile memories, and other semiconductor memories. In various embodiments, memory subsystem 1215 can include message storage data and program code 1240.

Storage subsystem 1220 can include hardware and/or software elements configured for storing information. Storage subsystem 1220 may store information using machine-readable articles, information storage devices, or computer-readable storage media. Storage subsystem 1220 may store information using storage media 1245. Some examples of storage media 1245 used by storage subsystem 1220 can include floppy disks, hard disks, optical storage media such as CD-ROMS, DVDs and bar codes, removable storage devices, networked storage devices, or the like. In some embodiments, all or part of message storage data and program code 1240 may be stored using storage subsystem 1220.

In various embodiments, computer system 1200 may include one or more hypervisors or operating systems, such as WINDOWS, WINDOWS NT, WINDOWS XP, VISTA, WINDOWS 12 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1200 may also include one or more applications configured to execute, perform, or otherwise implement techniques disclosed herein. These applications may be embodied as message storage data and program code 1240. Additionally, computer programs, executable computer code, human-readable source code, processing engines, or the like, and data, such as transaction data, models, objects, procedural descriptions, files, or the like, may be stored in memory subsystem 1215 and/or storage subsystem 1220.

The one or more input/output (I/O) interfaces 1225 can include hardware and/or software elements configured for performing I/O operations. One or more input devices 1250 and/or one or more output devices 1255 may be communicatively coupled to the one or more I/O interfaces 1225.

The one or more input devices 1250 can include hardware and/or software elements configured for receiving information from one or more sources for computer system 1200. Some examples of the one or more input devices 1250 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1250 may allow a user of computer system 1200 to interact with one or more non-graphical or graphical user interfaces to enter a comment, select objects, icons, text, user interface widgets, or other user interface elements that appear on a monitor/display device via a command, a click of a button, or the like.

The one or more output devices 1255 can include hardware and/or software elements configured for outputting information to one or more destinations for computer system 1200. Some examples of the one or more output devices 1255 can include a printer, a fax, a feedback device for a mouse or joystick, external storage systems, a monitor or other display device, a communications interface appropriately configured as a transceiver, or the like. The one or more output devices 1255 may allow a user of computer system 1200 to view objects, icons, text, user interface widgets, or other user interface elements.

A display device or monitor may be used with computer system 1200 and can include hardware and/or software elements configured for displaying information. Some examples include familiar display devices, such as a television monitor, a cathode ray tube (CRT), a liquid crystal display (LCD), or the like.

Communications interface 1230 can include hardware and/or software elements configured for performing communications operations, including sending and receiving data. Some examples of communications interface 1230 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1230 may be coupled to communications network/external bus 1280, such as a computer network, to a FireWire bus, a USB hub, or the like. In other embodiments, communications interface 1230 may be physically integrated as hardware on a motherboard or daughter board of computer system 1200, may be implemented as a software program, or the like, or may be implemented as a combination thereof.

In various embodiments, computer system 1200 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1200.

As suggested, FIG. 12 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for managing and storing emails in an on-demand, multi-tenant database system, the method comprising:
  receiving an email at a first computer system associated with the multi-tenant database system, the first computer system operating on a first platform;
  creating a message object by analyzing the email and associating email content with at least one predefined message object, the predefined message object including at least one of a lead message object, a contact message object, an account message object, and an opportunity message object;
  determining associations between the email and other stored message objects;
  determining, with one or more processors associated with the first computer system, a header portion of the email based on header information associated with the email, the header portion including information about the determined associations;
  determining, with a processor associated with the first computer system, a body portion of the email which is different from the header portion, the body portion containing the body of the email message designated not to be stored in a database of the multi-tenant database system;
  storing, with the processor associated with the first computer system, the header portion in the multitenant database with a reference to the body portion as stored in a remote storage device different from the database and outside the multi-tenant database system, the remote storage device operating on a second computer system operating on a second platform different from the first platform; and
  processing the emails in the on-demand, multi-tenant database system based on at least one of the stored header portion and the stored body portion.

2. The method of claim 1 wherein determining, with the processor associated with the first computer system, the header portion of the email comprises determining header information and generating one or more summaries of the email.

3. The method of claim 1 wherein determining, with the processor associated with the first computer system, the body portion of the email comprises extracting the body of the email message.

4. The method of claim 1 wherein storing, with the processor associated with first computer system, the header portion in the database with the reference to the body portion as stored in the remote storage device different from the database comprises populating a field in the database with a link to the body portion of the email in the remote storage device.

5. The method of claim 1 further comprising:
  receiving, at the first computer system, information defining how to determine the header portion of the email, the information specifying at least one of an attribute and a property of the email.

6. The method of claim 1 further comprising:
  receiving, at the first computer system, information defining how to determine the body portion of the email, the information specifying at least one of an attribute and a property of the email.

7. The method of claim 1 further comprising:
  identifying an attachment associated with the email; and
  storing an instance of the attachment with the header portion such that subsequent emails having the attachment are stored with a reference to the instance of the attachment.

8. A non-transitory computer-readable medium storing computer-executable code for managing and storing emails in an on-demand, multi-tenant database system, the non-transitory computer-readable medium comprising:
  code for receiving an email;
  code for creating a message object by analyzing the email and associating email content with at least one predefined message object, the predefined message object including at least one of a lead message object, a contact message object, an account message object, and an opportunity message object;

code for determining associations between the email and other stored message objects;

code for determining a header portion of the email based on header information associated with the email, the header portion including information about the determined associations;

code for determining a body portion of the email which is different from the header portion, the body portion containing the body of the email message and designated not to be stored in a database of the multi-tenant database system;

code for storing the header portion in the database with a reference to the body portion as stored in a remote storage device different from the database and outside the multi-tenant database system, the remote storage device operating on a second computer system operating on a second platform different from the first platform; and code for processing the emails in the on-demand, multi-tenant database system based on at least one of the stored header portion and the stored body portion.

9. The non-transitory computer-readable medium of claim 8 wherein the code for determining the header portion of the email comprises code for determining header information and generating one or more summaries of the email.

10. The non-transitory computer-readable medium of claim 8 wherein the code for determining the body portion of the email comprises extracting a header and body of the email.

11. The non-transitory computer-readable medium of claim 8 wherein the code for storing the header portion in the database with the reference to the body portion as stored in the remote storage device comprises populating a field in the database with a link to the body portion of the email in the remote storage device.

12. The non-transitory computer-readable medium of claim 8 further comprising:
code for receiving information defining how to determine the header portion of the email, the information specifying at least one of an attribute and a property of the email.

13. The non-transitory computer-readable medium of claim 8 further comprising:
code for receiving information defining how to determine the body portion of the email, the information specifying at least of an attribute and a property of the email.

14. The non-transitory computer-readable medium of claim 8 further comprising:
code for identifying an attachment associated with the email; and
code for storing an instance of the attachment such that subsequent emails having the attachment are stored with a reference to the instance of the attachment.

15. A management system for storing emails in a multi-tenant database system, the management system comprising:
a database within the multi-tenant database system operating on a first platform;
a remote storage device operating on a second platform outside the multi-tenant database system, the second platform being different from the first platform; and
a first computer system associated with the multi-tenant database system including computer instructions configured to cause the system to:
receive an email;
create a message object based on the email;
creating a message object by analyzing the email and associating email content with at least one predefined message object, the predefined message object including at least one of a lead message object, a contact message object, an account message object, and an opportunity message object;
determine associations between the email and other stored message objects;
determine a header portion of the email, the header portion including information about the determined associations;
determine a body portion of the email, the body portion designated not to be stored in a database of the multi-tenant database system;
store the header portion in the database with a reference to the body portion as stored in the remote storage device; and
process the emails in the on-demand, multi-tenant database system based on at least one of the stored header portion and the stored body portion.

16. The system of claim 15 wherein to determine the header portion of the email the first computer system is configured to determine header information and generating a summary of the email.

17. The system of claim 15 wherein to determine the body portion of the email the one or more computer systems are configured to determine extracting a header and body of the email.

18. The system of claim 15 wherein, to store the header portion in the database with the reference to the body portion as stored in the remote storage device, the first computer system is further configured to populate a field in the database with a link to the body portion of the email in the remote storage device.

19. The system of claim 15 wherein the first computer system is further configured to:
receive information defining how to determine the header portion of the email, the information specifying an attribute or a property of the email.

20. The system of claim 15 wherein the first computer system is further configured to:
receive information defining how to determine the body portion of the email, the information specifying an attribute or a property of the email.

21. The system of claim 15 wherein the first computer system is further configured to:
identify an attachment associated with the email; and
store an instance of the attachment in the remote storage device such that subsequent emails having the attachment are stored with a reference to the instance of the attachment.

* * * * *